(12) United States Patent
Sudarsky

(10) Patent No.: US 12,548,236 B2
(45) Date of Patent: Feb. 10, 2026

(54) TECHNIQUE FOR RENDERING HIDDEN STRUCTURES WITH CLIP PLANES

(71) Applicant: Siemens Healthineers AG, Forchheim (DE)

(72) Inventor: Sandra Sudarsky, Bedminster, NJ (US)

(73) Assignee: Siemens Healthineers AG, Forchheim (DE)

( * ) Notice: Subject to any disclaimer, the term of this patent is extended or adjusted under 35 U.S.C. 154(b) by 86 days.

(21) Appl. No.: 18/604,831

(22) Filed: Mar. 14, 2024

(65) Prior Publication Data

US 2024/0331269 A1 Oct. 3, 2024

(51) Int. Cl.
*G06T 15/08* (2011.01)
*G06T 15/30* (2011.01)
*G06T 15/50* (2011.01)
*G06T 19/00* (2011.01)

(52) U.S. Cl.
CPC .............. *G06T 15/08* (2013.01); *G06T 15/30* (2013.01); *G06T 15/50* (2013.01); *G06T 19/00* (2013.01); *G06T 2210/41* (2013.01); *G06T 2219/008* (2013.01)

(58) Field of Classification Search
None
See application file for complete search history.

(56) References Cited

U.S. PATENT DOCUMENTS 11,723,748 B2 * 8/2023 Li ..................... G06T 7/0014
345/423

OTHER PUBLICATIONS

Shuang Zhao, Wenzel Jakob, Tzu-Mao Li, "Physics-Based Differentiable Rendering: A Comprehensive Introduction", 2020, SIGGRAPH '20 Courses, ACM ISBN 978-1-4503-7972-4/20/08, pp. 1-36 (Year: 2020).*
Felix Petersen, Bastian Goldluecke, Christian Borgelt, Oliver Deussen, "GenDR: A Generalized Differentiable Renderer", 2022, Proceedings of the IEEE/CVF Conference on Computer Vision and Pattern Recognition (CVPR), pp. 4002-4011 (Year: 2022).*
Knoll, Aaron, et al. "Volume ray casting with peak finding and differential sampling." IEEE Transactions on Visualization and Computer Graphics 15.6 (2009): 1571-1578.

(Continued)

*Primary Examiner* — Michael J Cobb

(57) ABSTRACT

A hidden structure of a volumetric data set is rendered in a medical image based on a volumetric data set received from a medical scanner. Reference information indicative of a parameter for a clip plane is received for rendering the hidden structure within the medical image. A differentiable rendering, DR, algorithm is applied on the received volumetric data set, which comprises determining a light accumulation along a viewing ray. The clip plane is approximated by including a smooth approximation to a Dirac delta distribution, which depends on the parameter comprised in the received reference information, in the determining of the light accumulation along the viewing ray. The parameter for the clip plane is optimized by optimizing an objective function. The medical image with the hidden structure visible is output for final rendering, and/or for display.

20 Claims, 9 Drawing Sheets

(56) References Cited

OTHER PUBLICATIONS

Kronander, Joel, et al. "Efficient visibility encoding for dynamic illumination in direct vol. rendering." IEEE Transactions on Visualization and Computer Graphics 18.3 (2011): 447-462.

Li, Tzu-Mao, et al. "Differentiable monte carlo ray tracing through edge sampling." ACM Transactions on Graphics (TOG) 37.6 (2018): 1-11.

Loubet, Guillaume, Nicolas Holzschuch, and Wenzel Jakob. "Reparameterizing discontinuous integrands for differentiable rendering." ACM Transactions on Graphics (TOG) 38.6 (2019): 1-14.

Weiss, et al. "Differentiable Direct vol. Rendering," IEEE Trans on Visualization and Computer Graphics, vol. 28, No. 1, pp. 562-572, Jan. 2022.

Extended European Search Report (EESR) mailed Sep. 4, 2023 in corresponding European Application No. 23164672.0.

\* cited by examiner

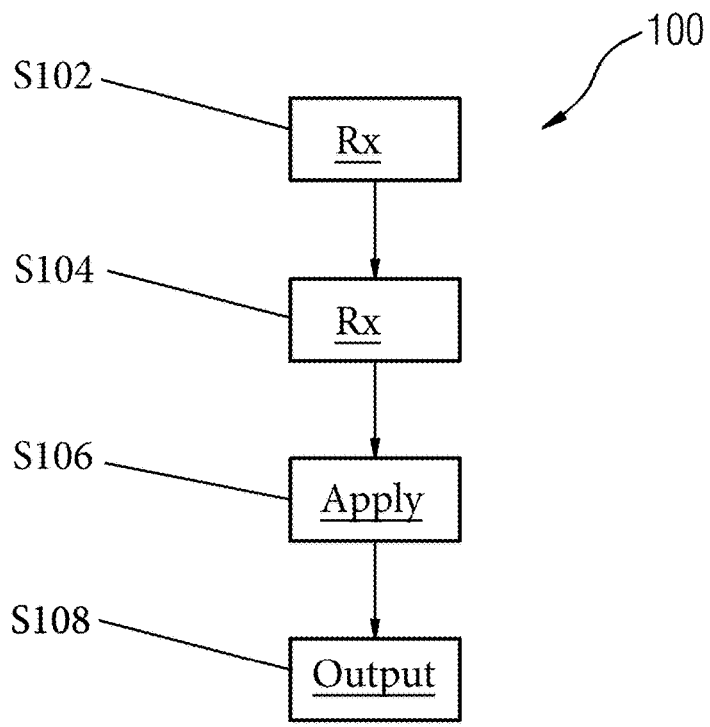
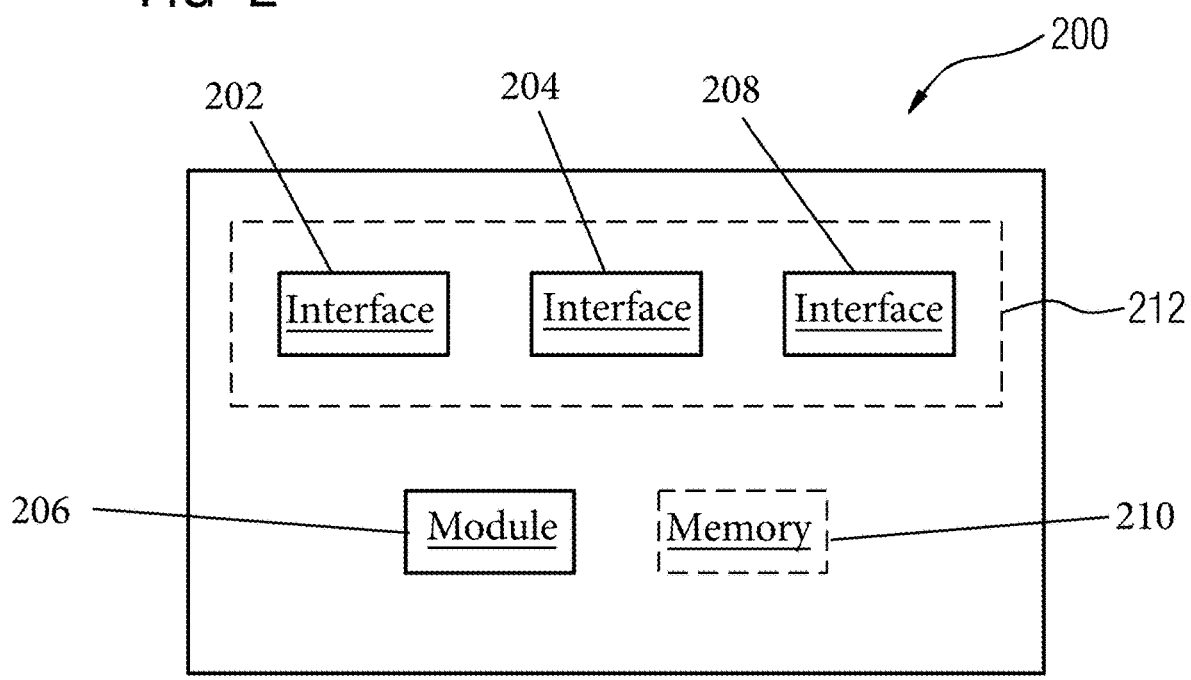

802

802       802

TECHNIQUE FOR RENDERING HIDDEN STRUCTURES WITH CLIP PLANES

RELATED APPLICATION

This application claims the benefit of EP 23164672.0, filed on Mar. 28, 2023, which is hereby incorporated by reference in its entirety.

BACKGROUND

Clipping in the context of volume rendering is a method of specifying which regions of the volume should be rendered. In medical visualization, clipping techniques are essential due to the complexity of the human anatomy. Clipping is used for exploring the inner structures of the data that would otherwise be obstructed for the viewer.

For instance, FIGS. 3A and 3B show a rendered image of a computed tomography (CT) study (also denoted as CT scan) of a patient's spine 304 after surgery without and with a clip plane, respectively. The screws 302; 302' are (at least partially) hidden for the camera by the bone structures 304 as depicted in the image 300 in FIG. 3A, and the screws 302; 302' become visible only once a clip plane is added, and/or activated, at the right location with the precise orientation, as exemplified by the image 301 in FIG. 3B.

Estimating the optimal position and orientation for clip planes to illustrate or highlight a particular condition is a time-consuming task. However, most imaging software platforms, support clip planes and crop boxes as interactive volume clipping mechanisms.

Differentiable renderers have been used in the past to tackle problems without introducing discontinuities, such as estimating optimal camera viewpoints or transfer functions to approximate a reference image. However, no use of differentiable renderers to estimate the position and orientation of clip planes has been described, as the presence of clip planes introduces discontinuities, making the rendering problem non-differentiable.

Differentiable volume rendering algorithms have gained a lot of attention in recent years due to their ability to learn input parameters to render a scene that can optimize an objective function. These algorithms can be designed, for example, to create a rendering that closely matches a reference image or to find the camera parameters that provide the best view for a particular scene.

A number of differentiable renders have been proposed to solve this inverse problem. In one approach, a differentiable renderer for triangular meshes overcomes the problem of geometric discontinuities and occlusions using an edge sampling approach. At the edges of objects, both sides, the background and the foreground of the edge, are sampled, and contributions for both sides are used. In another approach, an approximate algorithm for triangle meshes avoids edge sampling through reparameterization converting boundary integrals to area integrals. However, the approach based on meshes cannot be directly applied to the case of volume rendering.

Unlike the approaches that focus of meshes, another approach uses a differentiable volume renderer. The continuous parameters of the rendering process are optimized. In particular, the differentiable renderer to find optimal camera parameters maximizes image entropy or determines the transfer function that best matches a reference image.

However, this differentiable volume renderer cannot be straightforwardly or directly applied to estimate the location, position, and/or orientation of clip planes, clip surfaces or crop boxes, as the presence of clip planes, clip surfaces or crop boxes introduces discontinuities, making the rendering process non-differentiable.

Optimizing locations, positions, and/or orientations of clip planes, clip surfaces and crop boxes is therefore conventionally performed manually and in a highly time-consuming manner, preventing any use in real-time applications, e.g., for surgical guidance, validation (also denoted as verification, checkup, and/or examining) of a performed surgical procedure, and/or diagnostic purposes. Moreover, efficiently optimizing locations, positions, and/or orientations of clip planes, clip surfaces and crop boxes conventionally requires extensive training and experience by the user (e.g., a medical practitioner).

SUMMARY AND DESCRIPTION

It is therefore an object to provide an efficient (e.g., in terms of time and/or computing resources) solution for incorporating the differentiable rendering of hidden structures within medical images. Alternatively, or in addition, an object is to provide a technique for incorporating clip planes, clip surfaces, and/or crop boxes in differentiable (e.g., volume) rendering of medical data sets, in particular while preserving the advantages of differentiable rendering in relation to continuous rendering parameters, such as camera, transfer function, lighting, opacity and/or color.

This object is solved by a method for rendering a hidden structure of a volumetric data set when rendering a medical image based on the volumetric data set, by a computing device, by a system comprising the computing device, by a computer program (also denoted as computer program product), and by a non-transitory computer-readable medium according to the appended independent claims. Advantageous aspects, features, and embodiments are described in the dependent claims and in the following description together with advantages.

In the following, the solution is described with respect to the claimed method as well as with respect to the claimed device. Features, advantages or alternative embodiments herein can be assigned to the other claimed objects (e.g., the system, the computer program, a computer program product, and/or the computer-readable medium), and vice versa. In other words, claims for the device and/or system can be improved with features described or claimed in the context of the method. In this case, the functional features of the method are embodied by structural units (and/or modules) of the device and/or system, and vice versa, respectively.

As to a method aspect, a (in particular computer-implemented) method for rendering a hidden structure of a volumetric data set when rendering a medical image based on the volumetric data set is provided. The volumetric data set is received from a medical scanner. The method including an act of receiving the volumetric data set from the medical scanner. The method further includes an act of receiving reference information indicative of (e.g., an initial value of) at least one parameter for a clip plane within a medical image for rendering the hidden structure included in the received volumetric data set. The method further includes an act of applying a differentiable rendering (DR) algorithm on the received volumetric data set for rendering the medical image with the hidden structure. Applying the DR algorithm includes determining a light accumulation along a viewing ray. The clip plane is approximated by including a smooth approximation to a Dirac delta distribution in the determining of the light accumulation along the viewing ray. The smooth approximation to the Dirac delta distribution depends on the (e.g., initial value of the) at least one parameter included in the received reference information. Applying the DR algorithm further includes optimizing the at least one parameter for the clip plane by optimizing an objective function. The method still further includes an act of outputting, based on the applied DR algorithm, the medical image with the hidden structure. The hidden structure is visible in the medical image output for final rendering and/or for display.

By the technique, a discontinuity due to the clip plane, which would impede the use of DR, can be avoided. Alternatively, or in addition, by the technique, an optimal position of a clip plane for medical purposes can be automatically determined, leading to time saving from receiving the volumetric data set from the medical scanner to performing the final rendering (also denoted as output for display, or displaying). E.g., a positioning of one or more implants, in particular after a surgical procedure in which the implants were placed, can be controlled by the technique in a timely manner. Alternatively, or in addition, by the technique, a diagnosis of a lesion (e.g., a tumor and/or a torn ligament) within an organ and/or anatomical structure (e.g., within the liver, a kidney, a joint, and/or a ligament) can be promptly (also: timely) performed, and/or improved. E.g., the medical image with optimized clip plane as well as optimized further (in particular continuous) rendering parameters can be made available such that a separate appointment date (e.g., on a different day) for a patient for reviewing a diagnostic result (and/or medical analysis) of the acquisition of the volumetric data set by the medical scanner can be avoided.

The volumetric data set may also be denoted as three-dimensional data set. Alternatively, or in addition, the volumetric data set may be received from a medical scanner including a (e.g., predetermined) imaging modality. The imaging modality may include computed tomography (CT), magnetic resonance imaging (MRI), ultrasound (US), positron emission tomography (PET), and/or single-photon emission computed tomography (SPECT).

Alternatively, or in addition, the volumetric data set may include a (e.g., cine) series of three-dimensional data sets over a time interval. Further alternatively, or in addition, the volumetric data set may vary over time (e.g., over a period of acquisition from the medical scanner).

The structure(s) of interest may be occluded (also: concealed, obscured, and/or hidden) behind an anatomical structure, an organ's surface, and/or behind a further structure, in particular including an implant or other synthetical structures, in the volumetric data set, when rendered without applying any clip plane. By applying the clip plane (also: clipping plane), the occluding structure may be removed from the rendered medical image. Thereby, the hidden structure may be made fully, or at least partially, visible (also: visualized, and/or shown) on the (e.g., finally rendered and/or displayed) medical image.

The clip plane may also be denoted as clip surface and/or clipping plane. Alternatively, or in addition, the clip plane may include two or more components and/or clip planes, in particular at relative non-vanishing angles. E.g., a crop box may be based, and/or may include, a plurality of clip planes. Alternatively, or in addition, a crop box may be based, and/or may include one or more spatially limited (and/or finitely extended) clip planes.

Alternatively, or in addition, in general a clip plane may be used to make everything in front of it transparent. Further alternatively, or in addition, by the change of transparency in front of the clip plane, usually a viewing ray traversal does not need to stop at the clip plane.

The hidden structure may include an implant, a synthetical structure, and/or an anatomical structure.

The implant may include a stent, a screw, and/or an artificial joint, e.g., an artificial hip. Alternatively, or in addition, the implant may include a sensory implant, a neurological implant, and/or a cardiovascular medical device (e.g., a cardiac stimulator, and/or pacemaker).

The anatomical structure may include an abnormality (also denoted as pathology), a lesion, a tumor, and/or a (e.g., at least partially torn) ligament.

The at least one parameter for the clip plane may include a position, and/or an orientation, of the clip plane.

The reference information may include a reference image, e.g., from a database for a predetermined type of (in particular anatomical) structure, and/or organ, included in the volumetric data set. Alternatively, or in addition, the reference information may include position information for the clip plane, e.g., based on a segmentation of (in particular anatomical) structures, and/or organs, included in the volumetric data set. E.g., the at least one parameter may be indicative of applying the clip plane approximately centrally within an organ.

The DR may also be denoted as differentiable volume rendering (DVR). Alternatively, or in addition, the DR algorithm may extend the functionalities, and/or workings, of the DVRs of Sebastian Weiss and Rudiger Westermann, "Differentiable Direct Volume Rendering", IEEE Transactions on Visualization and Computer Graphics, 562-572, 28, 1.

Applying the DR may include applying a rendering algorithm. The rendering algorithm may include raycasting, and/or (e.g., Monte Carlo) path tracing.

A (e.g., sharp) clip plane may have a vanishing thickness, may lead to a discontinuity in the volumetric data, and/or may preclude (and/or make impossible) the use of the DR algorithm. Alternatively, or in addition, a clip plane may be represented by the Dirac delta distribution (also denoted as δ-distribution, Dirac delta function, and/or δ-function). At the location (e.g., position, and/or orientation) of the clip plane, the Dirac delta distribution may be non-vanishing, and/or at any location (e.g., position, and/or orientation) outside the clip plane, the Dirac delta distribution may be vanishing.

The (e.g., sharp) clip plane may be approximated by a smoothed clip plane (which may also be denoted as soft clip plane). The smoothed clip plane may be represented by a smooth function (e.g., a Gaussian function) approximating the Dirac delta distribution with non-vanishing values within a non-vanishing thickness of the (e.g., smoothed) clip plane. The smooth function (e.g., the Gaussian function) may rapidly approximate a vanishing value outside the thickness of the (e.g., smoothed) clip plane.

By the smoothing of the clip plane, the volumetric data may remain continuous, and/or the DR algorithm may remain applicable. In particular, further (e.g., continuous) rendering parameters may still be optimized by the DR algorithm.

Applying the DR algorithm may include optimizing (e.g., iteratively) the at least one parameter for the clip plane (briefly also denoted as clip plane parameter), in particular the position and/or orientation of the clip plane, by optimizing an objective function.

The objective function may include a loss function, in particular for a reference image as the reference information. The loss function may be optimized by minimizing the difference between (briefly also denoted as: matching) the reference image and the medical image with the visibly rendered hidden structure, or at least parts thereof. Alternatively, or in addition, optimizing the loss function may include minimizing a mean square difference (also denoted as mean square error, MSE) between pixel values, maximizing structural similarities (also denoted as structural similarity index measure, SSIM), and/or alignment of feature extraction.

Image registration may be used, e.g., to match the medical image to a previous scan. Alternatively, or in addition, image registration is not necessarily used for the image comparison. Further alternatively, or in addition, image registration may, e.g., be used to map the target image (and/or reference image) into the rendered image before the loss function is computed, and/or before a value of the loss function is determined.

Alternatively, or in addition, (e.g., optimizing) the objective function may include (e.g., maximizing) an image entropy, in particular for the reference information including a position information relative to an (e.g., anatomical) structure, and/or organ, included in the volumetric data set. E.g., the at least one parameter may specify to initially set the clip plane centrally, e.g., based on a segmentation and/or classification, within an organ.

The optimizing of the objective function may include a combination of (e.g., minimizing) one or more loss functions, and/or (e.g., maximizing) image entropy.

The applying of the DR algorithm may be iterative. E.g., the received at least one parameter may include, and/or may determine, an initial value of the one or more clip plane parameters. The optimizing of the objective function may include varying the one or more clip plane parameters.

The optimization of the objective function, and/or of the at least one parameter for the clip plane, may be gradient-based.

The technique may be applied to more than one clip plane within a volumetric data set. Alternatively, or in addition, by applying more than one clip plane for the rendering of the medical image, more than one hidden structure (e.g., several implants) may be rendered visible. Alternatively, or in addition, the more than one clip plane may be applied at relative non-vanishing angles. E.g., by applying three clip planes at approximately right angles (90°) to each other, a pie-slice-shaped section (and/or wedge) of a human skull may be cut out of the medical image in order to provide a view on the brain.

Besides the at least one parameter for the clip plane, input parameters to the DR algorithm may include a camera parameter (also denoted as view parameter), and/or a transfer function (TF). By the TF, voxel values may be assigned to color, and/or opacity, of a pixel of the medical image.

The hidden structure may include an implant, in particular a stent, a screw, and/or an artificial joint, in particular an artificial hip. Alternatively, or in addition, the hidden structure may include an anatomical structure, in particular a lesion, a tumor, and/or a ligament.

The received reference information may include a medical reference image.

The medical reference image (briefly: reference image) may include a, e.g., previously stored medical image, in particular including a manually set clip plane. Alternatively, or in addition, the medical reference image may include a synthetic image, and/or a painted (also: sketched, and/or drawn) image. Alternatively, or in addition, medical images may be retrieved from a medical journal and/or a book, from a medical image database and/or a medical image library, e.g., provided by an medical expert.

The objective function may include a loss function depending on the medical reference image. Optimizing the loss function may include minimizing, and/or maximizing, the loss function.

The loss function may include the difference between the reference image and the medical image with the visibly rendered hidden structure. Alternatively, or in addition, the loss function may include a mean square difference (and/or MSE) between pixel values. Further alternatively, or in addition, the loss function may be based on structural similarities (and/or a SSIM), and/or on feature extraction.

The received reference information may include a (e.g., initial value of a) position relative to an anatomical structure, and/or relative to an organ.

The (in particular initial value of the) position relative to the anatomical structure, and/or relative to the organ, may be obtained by performing a segmentation, and/or a classification of the anatomical structure, and/or the organ, captured in the volumetric data set. The (in particular initial value of the) position may, e.g., include a central location (e.g., position, and/or orientation) within the segmented, and/or classified, anatomical structure, and/or organ.

Alternatively, or in addition, the objective function may include an image entropy. Optimizing the objective function may include maximizing the image entropy.

By maximizing the image entropy, structures, in particular lesions, within the volumetric data set may be rendered visible (also: visualized, and/or made visible). E.g., a lesion may correspond to, and/or may produce, an inhomogeneity in the medical image, which can be rendered visible by using the image entropy, e.g., as a measure for the (in particular image) inhomogeneity.

Maximizing the image entropy may be combinable with providing the initial value of the at least one parameter for the clip plane (also: clip plane parameter) by a reference image.

The objective function used for optimizing the at least one parameter may be determined (and/or selected) based on the received reference information.

Alternatively, or in addition, if a reference image is provided, different image quality metrics may be used as loss functions. Further alternatively, or in addition, if no reference image is provided, a non-reference loss function, and/or non-reference metric, needs to be used. Information entropy may be an example of a non-reference loss function.

The at least one parameter of the clip plane may include a position, and/or an orientation, of the clip plane within the volumetric data set.

The smooth approximation to the Dirac delta distribution may includes a Gaussian function. Alternatively, or in addition, the smooth approximation to the Dirac delta distribution may also be denoted as a nascent delta function.

For the purpose of computer graphics, the smooth approximation to Dirac's delta distribution (in particular the Gaussian function) may be discretized per voxel, and/or per pixel.

The light accumulation may be determined by raycasting, (e.g., Monte Carlo) path tracing, half-angle slicing, and/or interactive volume lighting, IVL.

The light accumulation may include local illumination effects (e.g., light attenuating from voxel to voxel due to the voxel's opacity, and/or from pixel to pixel due to the pixel's opacity), and/or global illumination effects (e.g., due to light scattering).

The at least one parameter of a clip plane may include two or more parameters, in particular of two or more clip planes.

The two or more clip planes may be non-parallel, and/or at non-vanishing angles. Thereby, a slice (and/or wedge) may be cut out of a rendered (e.g., anatomical) structure.

The medical scanner may be selected from the group of a CT scanner, an MRI scanner, a US scanner, a PET scanner, and/or a SPECT scanner.

As to a device aspect, a computing device (computer) for rendering a hidden structure of a volumetric data set when rendering a medical image based on the volumetric data set is provided. The volumetric data set is received from a medical scanner. The computing device includes a volumetric data set receiving interface configured for receiving a volumetric data set from a medical scanner. The computing device further includes a reference information receiving interface configured for receiving a reference information indicative of (e.g., an initial value of) at least one parameter for a clip plane within a medical image for rendering the hidden structure included in the received volumetric data set. The computing device further includes a processing module (e.g., a CPU, and/or GPU) configured for applying a DR algorithm on the received volumetric data set for rendering the medical image with the hidden structure. Applying the DR algorithm includes determining a light accumulation along a viewing ray. The clip plane is approximated by including a smooth approximation to a Dirac delta distribution in the determining of the light accumulation along the viewing ray. The smooth approximation to the Dirac delta distribution depends on the (e.g., initial value of the) at least one parameter included in the received reference information. Applying the DR algorithm further includes optimizing the at least one parameter for the clip plane by optimizing an objective function. The computing device still further includes an outputting interface configured for outputting, based on the applied DR algorithm, the medical image with the hidden structure. The hidden structure is visible in the medical image output for final rendering, and/or for display.

The computing device may be configured to perform the method according to the method aspect. Alternatively, or in addition, the computing device may include any feature disclosed in the context of the method according to the method aspect.

As to a system aspect, a system for rendering a hidden structure of a volumetric data set when rendering a medical image based on the volumetric data set is provided. The volumetric data set is received from a medical scanner. The system includes one or more medical scanners configured for providing a volumetric data set. The system further includes a computing device according to the device aspect. The volumetric data set receiving interface of the computing device is configured for receiving the volumetric data set from any one of the one or more medical scanners. The system still further includes a display device (briefly also: display) configured for receiving a medical image with a hidden structure from the outputting interface of the computing device. The display device is further configured for displaying, and/or final rendering, the received medical image with the hidden structure.

As to a further aspect, a computer program including program elements which induce a computing device to carry out the acts of the method, according to the method aspect, for rendering a hidden structure of a volumetric data set when rendering a medical image based on the volumetric data set is provided. The acts of the method are carried out when the program elements are loaded into a memory of the computing device.

As to a still further aspect, a non-transitory computer-readable medium, on which program elements are stored that can be read and executed by a computing device in order to perform acts of the method, according to the method aspect, for rendering a hidden structure of a volumetric data set when rendering a medical image based on the volumetric data set is provided. The acts of the method are performed when the program elements are executed by the computing device.

The properties, features and advantages of this invention described above, as well as the manner they are achieved, become clearer and more understandable in the light of the following description and embodiments, which will be described in more detail in the context of the drawings. This following description does not limit the invention on the contained embodiments. Same components or parts can be labeled with the same reference signs in different figures. In general, the figures are not for scale.

It shall be understood that a preferred embodiment of the present invention can also be any combination of the dependent claims or above embodiments with the respective independent claim.

These and other aspects of the invention will be apparent from and elucidated with reference to the embodiments described hereinafter.

BRIEF DESCRIPTION OF THE DRAWINGS

FIG. 1 is a flow chart of a method for rendering a hidden structure of a volumetric data set when rendering a medical image based on the volumetric data set according to a preferred embodiment;

FIG. 2 is an overview of the structure and architecture of a computing device for rendering a hidden structure of a volumetric data set when rendering a medical image based on the volumetric data set according to a preferred embodiment, wherein the computing device may be configured to perform the method of FIG. 1;

Figure 3A:
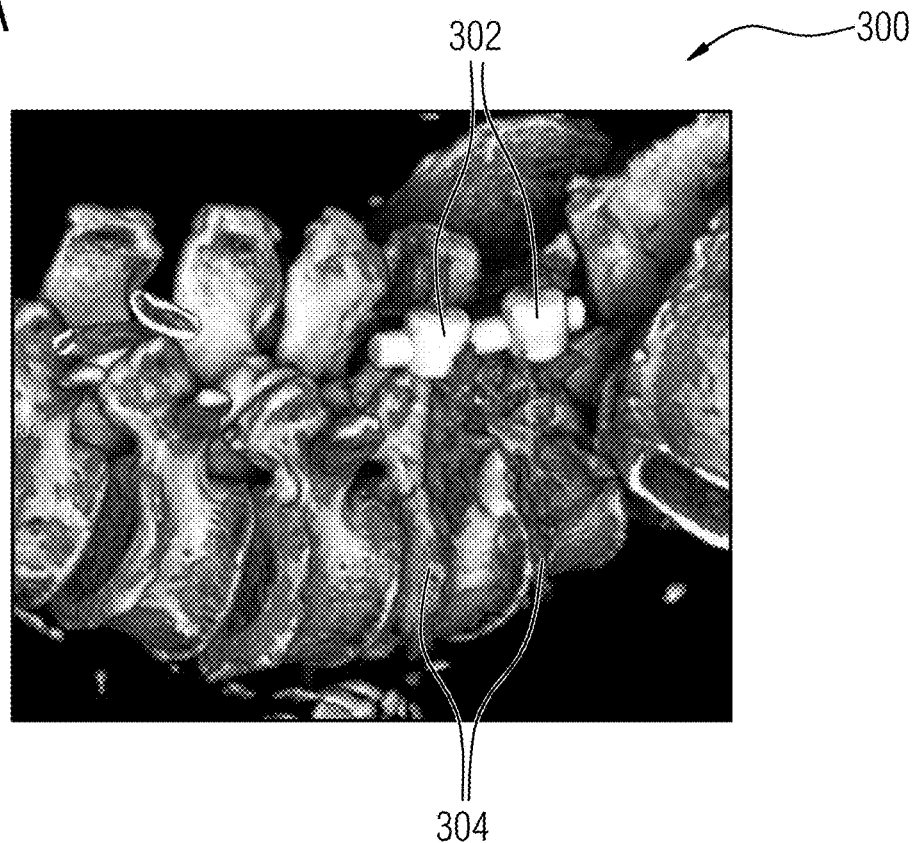
FIGS. 3A and 3B show an example of a rendered medical image based on a CT scan without and with a clip plane, respectively, with screws, as examples of hidden structures, surgically inserted into a patient's spine and rendered visible in the medical image with suitable position of the clip plane in FIG. 3B.
Figure 3B:
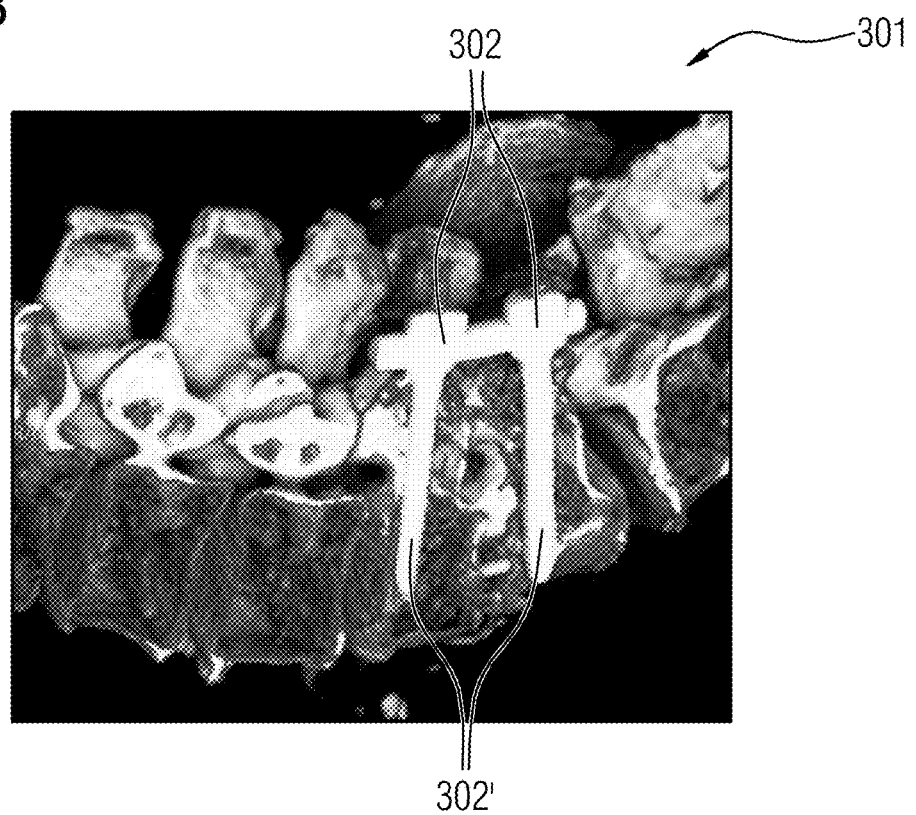

Any reference signs in the claims should not be construed as limiting the scope.

DETAILED DESCRIPTION

FIG. 1 schematically illustrates an exemplary embodiment of a computer-implemented method for rendering a hidden structure of a volumetric data set when rendering a medical image based on the volumetric data set, which is received from a medical scanner. The method is generally referred to by the reference sign 100.

The method 100 includes an act S102 of receiving the volumetric data set from the medical scanner.

The method 100 further includes an act S104 of receiving a reference information indicative of at least one parameter for a clip plane within a medical image for rendering the hidden structure included in the received S102 volumetric data set.

The method 100 further includes an act S106 of applying a differentiable rendering (DR) algorithm on the received S102 volumetric data set for rendering the medical image with the hidden structure. Applying S106 the DR algorithm includes determining a light accumulation along a viewing ray. The clip plane is approximated by including a smooth approximation to a Dirac delta distribution in the determining of the light accumulation along the viewing ray. The smooth approximation to the Dirac delta distribution depends on the at least one parameter included in the received S104 reference information. Applying act S106, the DR algorithm further includes optimizing the at least one parameter for the clip plane by optimizing an objective function.

The method 100 still further includes an act S108 of outputting, based on the applied S106 DR algorithm, the medical image with the hidden structure. The hidden structure is visible in the medical image outputted for final rendering, and/or for display.

FIG. 2 schematically illustrates an exemplary embodiment of a computing device (computer) for rendering a hidden structure of a volumetric data set when rendering a medical image based on the volumetric data set, which is received from a medical scanner. The computing device is generally referred to by the reference sign 200.

The computing device 200 includes a volumetric data set receiving interface 202 configured for receiving a volumetric data set from a medical scanner.

The computing device 200 further includes a reference information receiving interface 204 configured for receiving a reference information indicative of at least one parameter for a clip plane within a medical image for rendering the hidden structure included in the received volumetric data set.

The computing device 200 further includes a processing module 206 (processor) configured for applying a DR algorithm on the received volumetric data set for rendering the medical image with the hidden structure. Applying the DR algorithm includes determining a light accumulation along a viewing ray. The clip plane is approximated by including a smooth approximation to a Dirac delta distribution in the determining of the light accumulation along the viewing ray. The smooth approximation to the Dirac delta distribution depends on the at least one parameter included in the received reference information. Applying the DR algorithm further includes optimizing the at least one parameter for the clip plane by optimizing an objective function.

The computing device 200 still further includes an outputting interface 208 configured for outputting, based on the applied DR algorithm, the medical image with the hidden structure. The hidden structure is visible in the medical image outputted for final rendering, and/or for display.

The processing module 206 may be embodied by a processor and/or a central processing unit (CPU), and/or a graphics processing unit (GPU).

Optionally, the computing device 200 may include a memory 210.

Any one of the volumetric data set receiving interface 202, the reference information receiving interface 204, and/or the outputting interface 208 may be included in a common (e.g., input-output) interface 212.

The computing device 200 may be configured for performing the method 100.

A system for rendering a hidden structure of a volumetric data set when rendering a medical image based on the volumetric data set, which is received from a medical scanner, may include one or more medical scanners for acquiring the volumetric data set, a computing device (e.g., the computing device 200) for performing the method 100, and a display device.

The display device (briefly also denoted as display) may include a monitor and/or screen, and/or an extended reality (XR) device, in particular an XR headset. XR may be an umbrella term for augmented reality (AR), and/or virtual reality (VR). The XR device may include a head-mounted display (HMD), and/or a head-up display (HUD).

The technique (e.g., including the method 100, the computing device 200, and/or the system) may alternatively be denoted as technique for inverse volume rendering with clipping.

By the technique, a differentiable renderer (e.g., in performing the method act S106, and/or embodied by the processing module 206) is used to predict one or more optimal clip plane parameters to optimize an objective function. Depending on the application (e.g., for diagnostic purposes, and/or for post-surgical verification), the clip can serve to describe the presence of lesions, and/or the viewpoint to best visualize stents, screws, artificial joints, and/or any further implant. Alternatively, or in addition, the technique can be used to match a reference image from a medical database or a medical illustration.

Rendering a three-dimensional (3D) scene (e.g., corresponding to, and/or encoded by, a volumetric data set) may include the process of generating a two-dimensional (2D) image I by simulating the interaction of the light with the objects in the scene (and/or included in the volumetric data set).

Figure 4A:
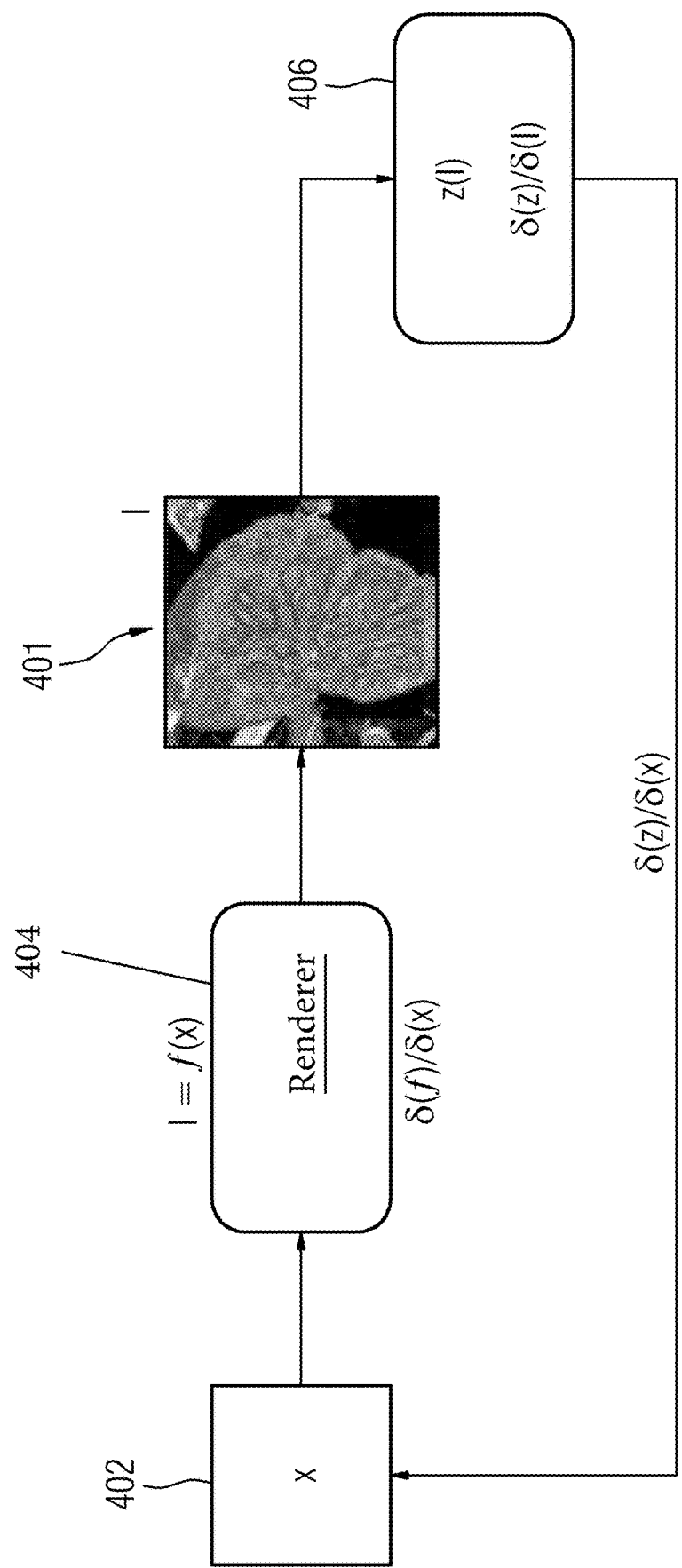
FIGS. 4A and 4B schematically illustrate examples of the applying of a differentiable rendering (DR) algorithm according to the method of FIG. 1, in FIG. 4A without a reference image and, e.g., maximizing of an image entropy, and in FIG. 4B with a reference image and optimizing a loss function involving the reference image.
Figure 4B:
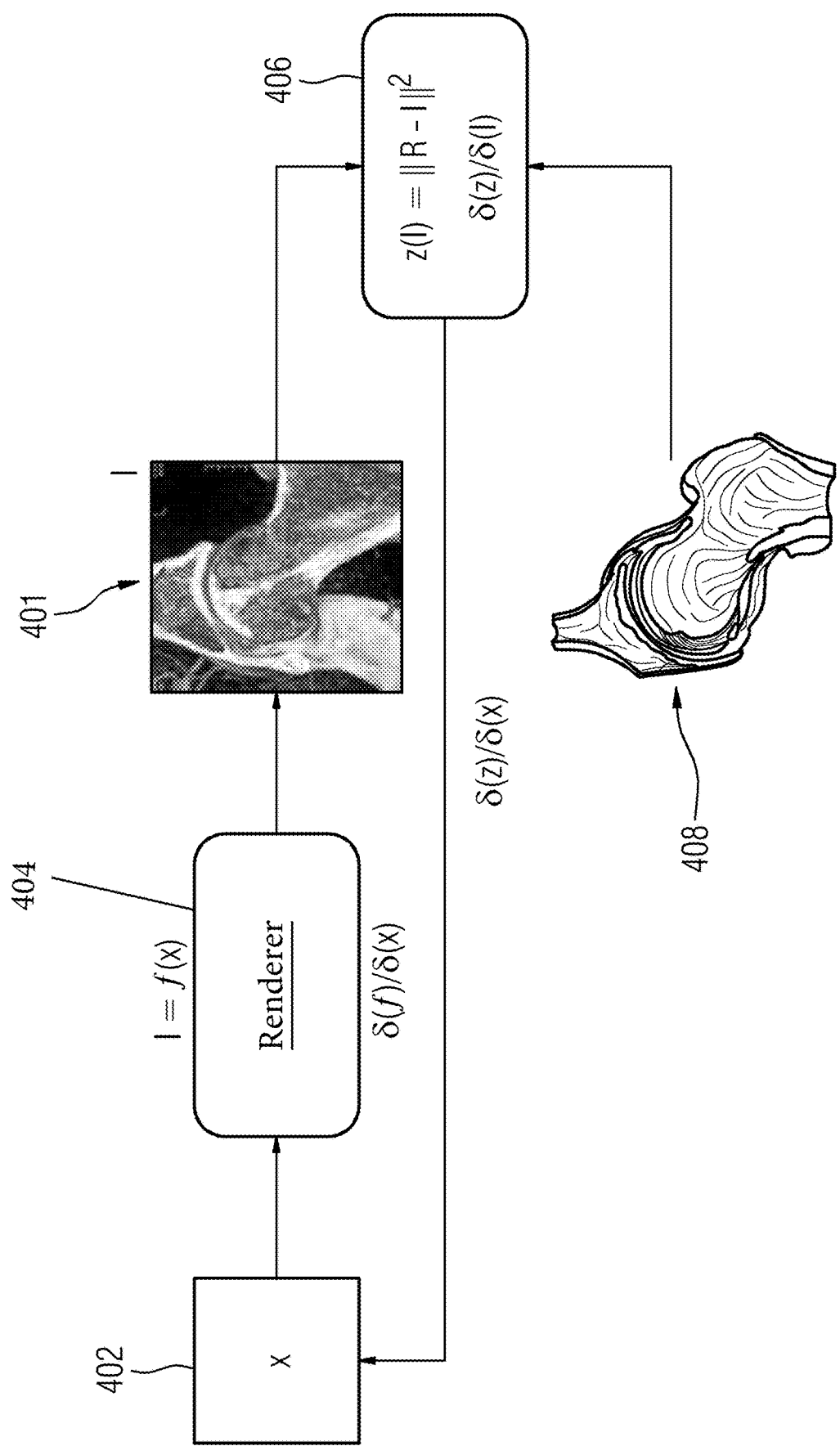

Alternatively, or in addition, rendering may be described as a function f that takes input parameters x and produces a rendered medical image I=f(x). As shown in FIGS. 4A and 4B, differentiable renderers at reference sign 404 aim at solving the inverse problem, that is, predicting the scene parameters x at reference sign 402 from a particular medical image I, as exemplified at reference sign 401. DR algorithms work by propagating derivatives with respect to the input parameters x to maximize a loss function z(I), usually by some form of gradient-based optimization technique, as indicated at reference sign 406.

FIG. 4A schematically illustrates a differentiable renderer 404 designed to learn input parameters x at reference sign 402 based on a general loss function z(I) at reference sign 406.

The medical image I at reference sign 401 in FIG. 4A provides an example of a cross section of (e.g., patient's) left kidney rendered by using a (e.g., smoothed) clip plane. The clip plane for the rendered medical image I at reference sign 401 in FIG. 4A may, e.g., be obtained by providing a position (e.g., approximately centrally within the left kidney) as reference information for the clip plane parameter. Alternatively, or in addition, the location (e.g., position, and/or orientation) of the clip plane in the medical image I at reference sign 401 of FIG. 4A may be determined based on maximizing image entropy (e.g., as the objective function z(I) at reference sign 406 in FIG. 4A). The hidden structure shown in the rendered medical image I at reference sign 401 in FIG. 4A includes the internal structures (e.g., thickness of the renal cortex, renal medulla, renal papilla, renal pyramids, renal columns) of the left kidney.

FIG. 4B schematically illustrates a differentiable renderer 404 with loss function z(I) at reference sign 406 designed to learn input parameters x at reference sign 402 to match a reference image R (also denoted as target image) as exemplified at reference signs 408 and 406.

The medical image I at reference sign 401 of FIG. 4B provides an example of a cross section of a left hip joint using a (e.g., smoothed) clip plane. The clip plane for the rendered medical image I at reference sign 401 in FIG. 4B may, e.g., be obtained by providing a location (e.g., position and/or orientation) of the clip plane in terms of the reference image 408 as the reference information for the clip plane parameter. Alternatively, or in addition, the location (e.g., position, and/or orientation) of the clip plane in the medical image I at reference sign 401 of FIG. 4B may be determined based on a MSE, SSIM, and/or feature extraction (e.g., as the objective function z(I) at reference sign 406 in FIG. 4B).

In FIG. 4B, in the reference image 408, relevant hip structures may be visible (e.g., acetabulum, fibrous capsule, cavity of joint, synovial membranes, cartilage, head of femur, ligament of head of femur, synovial membranes, transverse ligament of acetabulum, fibrous capsule, zona orbicularis, and/or pubofemoral ligament).

A 3D scene (e.g., as encoded by the volumetric data set) usually includes geometrical models, materials, camera properties, light sources, and/or other input parameters to the rendering system.

In medical visualization (e.g., according to the technique), the scene may include at least a volume (e.g., from a CT, MRI, and/or PET scan) together with a transfer function that maps voxel values to colors and opacities. Different direct volume rendering algorithms have been described in the literature, including raycasting algorithms and recently (e.g., Monte Carlo) path tracing techniques that simulate the physics of light along light paths for each pixel to generate photorealistic depictions of medical data.

Fortunately, the conventional volume rendering process is differentiable with respect to most scene parameters, as the gradients can be estimated and propagated. However, this is not the case when clipping objects (e.g., clip planes, clip surfaces, and/or crop boxes) are present in the 3D scene (e.g., applied to the volumetric data set). The introduction of clip planes (also denoted as clipping planes or clipping surfaces), for example, introduces discontinuities, making the rendering process not differentiable. The technique overcomes this deficiency by incorporating clip planes (and/or clipping surfaces) to the rendering process without introducing discontinuities.

Figure 5A:
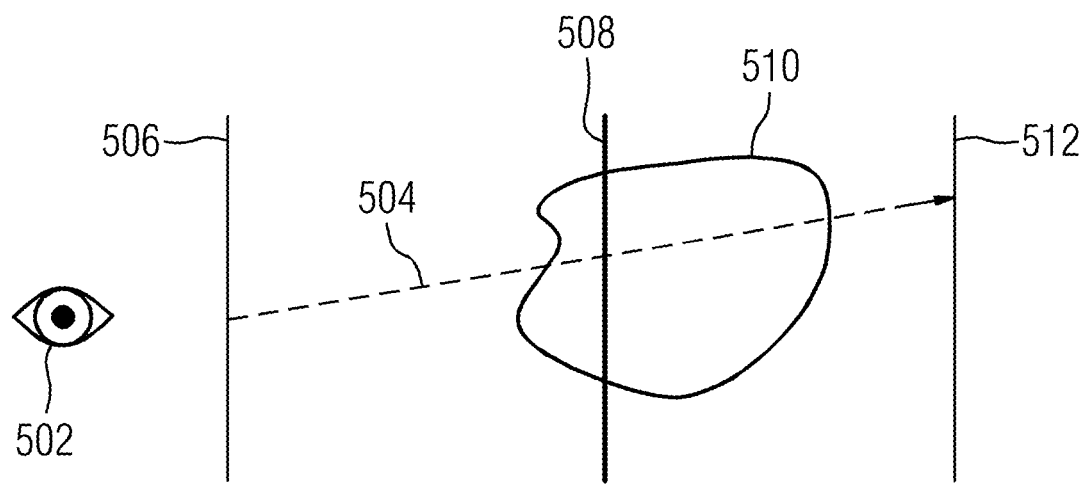
FIGS. 5A and 5B schematically illustrate examples of the use of a conventional sharp clip plane and a smoothed clip plane, respectively.
Figure 5B:
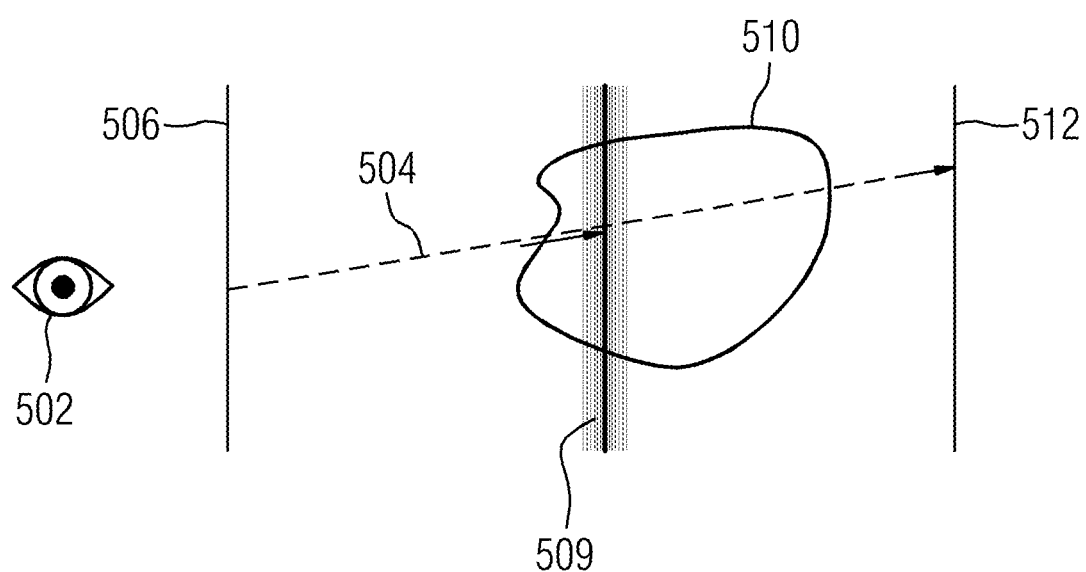

FIGS. 5A and 5B schematically illustrate the use of a conventional (e.g., sharp) clip plane 508 versus a smoothed clip plane 509, respectively.

The reference signs 506 and 512 denote the conventional near and far clip planes (briefly also denoted as near clip plane and far clip plane), respectively. The near and far clip planes may denote the front and rear boundaries of the volumetric data set, respectively, e.g., as viewed by an observer 502. At reference sign 504, an exemplary viewing ray is depicted, which passes through an anatomical structure 510, and/or an organ 510, within which a hidden structure is to be made visible (and/or rendered) by a conventional manually set (e.g., sharp) clip plane 508 in FIG. 5A, or by the smoothed clip plane 509 in FIG. 5B, which is determined by optimizing an objective function (and/or by a computing algorithm, in particular including the DR algorithm).

In general, a viewing ray 504 traversing the anatomical structure 510 (and/or organ 510) may start at the near clip plane 506 and stops when the accumulated alpha (and/or the accumulated opacity) reaches a (in particular upper) threshold, a clip plane 508; 509 for rendering a hidden structure is reached, or the far clip plane 512 is reached.

Herein, alpha may include values between 0 and 1 for full transparency and full opacity, respectively. The viewing ray 504 may, e.g., stop when alpha exceeds a value of 0.9.

Alternatively, or in addition, in general a clipping plane (e.g., the clip plane 508 or 509) may be used to make everything in front of it transparent. Therefore, it need not be used to stop the ray 504 traversal. Alternatively, or in addition, the viewing ray 504 does not need to stop at the clip plane 508; 509.

Let V be a 3D volume with scalar densities values, t an absorption function that maps the scalar densities values to opacities and C a function that maps the scalar values to colors. An image can be generated by computing the light accumulation along view rays r(t) (e.g., as depicted as reference sign 504 in FIG. 5A) parameterized from the near plane a (e.g., as depicted as reference sign 506 in FIG. 5A) and to the far plane b (e.g., as depicted as reference sign 512 in FIG. 5A). The light intensity equation can be written as (see Weiss "Differentiable Direct Volume Rendering"):

$$L = \int_a^b h\big(V(r(t))e^{-\int_a^t \tau(r(u))du}dt,$$

where $h(v)=\tau(v)C(v)$ corresponds to the emission portion of the equation, while the exponential term corresponds to the absorption.

According to the technique, a "smooth clipping" is used to remove the discontinuities intrinsic to visibilities changes, modulating the clipping, e.g., with a Gaussian function, as schematically shown by the smoothed clip plane at reference sign 509 in FIG. 5B.

According to the technique, the light intensity formulation is extended by adding a Gaussian function $$g(x) = e^{-\frac{ax^2}{2\sigma^2}}$$

to the absorption equation to represent the "smooth clipping" (e.g., at reference sign 509 in FIG. 5B). The inventive equation then becomes:

$$\int_a^b h\Big(V(r(t))e^{-\int_a^t \tau(r(u))g(r(u))du}dt.$$

Since the above integral cannot be solved analytically, it is often approximated by discrete ray segments, each assumed to have constant absorption and emission. The discrete transparency at sample i can be written as $\alpha_i = 1 - e^{-\Delta t \tau V(i) g(i)}$, where V(i) is the density of the volume and g(i) is the Gaussian function at sample i along the viewing ray (e.g., at reference sign 504 in FIG. 5B).

With the modification of including the Gaussian function, the same automatic (and/or computerized, and/or algorithmic) differentiation described in [Weiss] can be applied even in the presence of clip planes 509.

Using the technique, the differentiable renderer can be used to estimate the location (e.g., position, and/or orientation) of the clip planes 509 to optimize an objective function, in particular a (e.g., given) loss function. For instance, given a reference image (also denoted as target image) 408, the loss function may be formulated as the image difference between the rendered medical image 401 and the reference image (or target image) 408. The simplest loss function may, e.g., be a mean square difference (and/or MSE) between the pixel values of the two images 401; 408. More complicated loss functions may, e.g., include image registration, structural similarities (and/or SSIM), and/or feature extraction.

Image registration may for example be used to map the target image (and/or reference image) into the rendered image before the loss function is computed, and/or before a value of the loss function is determined.

Figure 6A:
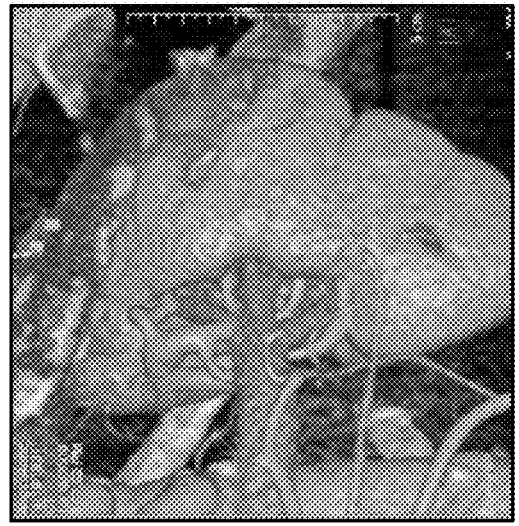
FIGS. 6A, 6B and 6C show examples of rendering a left kidney without clip plane in FIG. 6A and with a smoothed clip plane in FIG. 6C, where the position of the smoothed clip plane is determined from the reference image in FIG. 6B, e.g., in which a sharp clip plane had previously been selected manually.
Figure 6B:
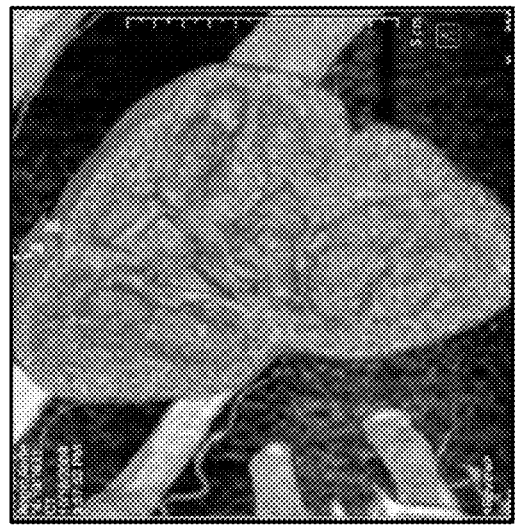
Figure 6C:
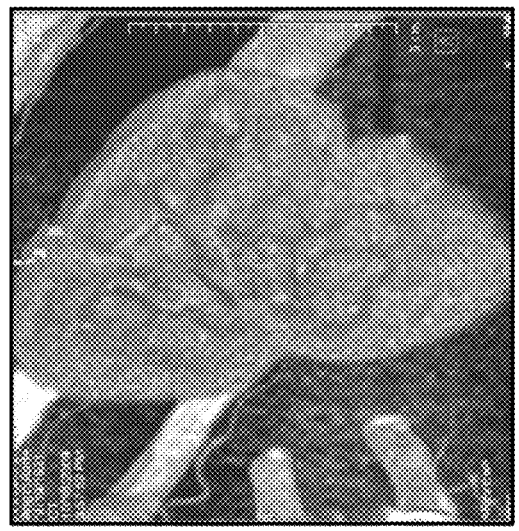

Based on the inventive technique, exemplary medical images of a patient's left kidney from a CT scan are shown in FIGS. 6A, 6B and 6C. In FIG. 6A, the medical image of the left kidney is shown without clip plane. In FIG. 6B, a reference image 301 is shown, e.g., based on a previous conventional manual selection of a sharp clip plane. In FIG. 6C, the medical image 401 with smoothed clip plane (also denoted as soft clip plane) according to the technique is displayed.

As visible, the medical image 401 in FIG. 6C based on the technique is only very slightly more diffuse (and/or has outlines only very slightly softened, and/or blurred) than the reference image 301 in FIG. 6B. E.g., the discernible hidden structure shown in the rendered medical image at reference sign 401 in FIG. 6C includes the internal structures (e.g., thickness of the renal cortex, renal medulla, renal papilla, renal pyramids, renal columns) of the left kidney as discernible in the reference image 301 in FIG. 6B.

Figure 7C:
FIGS. 7A, 7B and 7C show examples of rendering a left hip joint without clip plane in FIG. 7A and with a smoothed clip plane in FIG. 7C, where the position of the smoothed clip plane is determined from the reference image in FIG. 7B, e.g., in which a sharp clip plane had previously been selected manually.
Figure 7B:
Figure 7A:
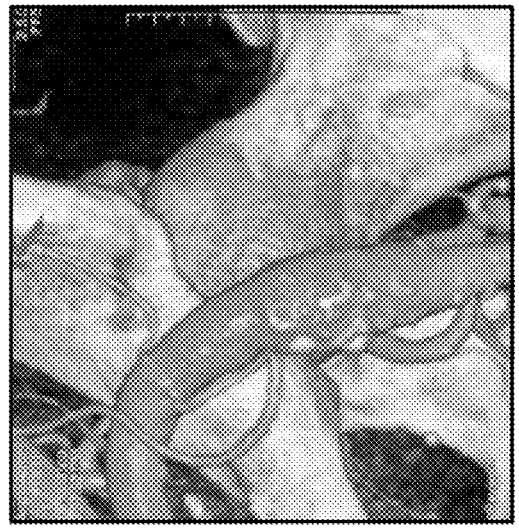

Based on the technique, exemplary medical images of a patient's left hip are shown in FIGS. 7A, 7B and 7C. In FIG. 7A, the medical image of the left hip is shown without clip plane. In FIG. 7B, a reference image 301 is shown, e.g., based on a previous conventional manual selection of a sharp clip plane. In FIG. 7C, the medical image 401 with smoothed clip plane (also denoted as soft clip plane) according to the technique is displayed.

The hip images of FIGS. 7A, 7B and 7C may be based on a CT scan, and/or an MRI scan.

As visible, the medical image 401 in FIG. 7C based on the technique is only very slightly more diffuse (and/or has outlines only very slightly softened, and/or blurred) than the reference image 301 in FIG. 7B. E.g., a brightness (and/or color) corresponding to a density of the bone structures in FIGS. 7C and 7B may be identical, up to a slight softening of outlines (and/or boundaries between different brightnesses) in FIG. 7C. A compact bone (and/or high density of the bone structure) may correspond to a white region, and/or a very spongy bone (and/or low density of the bone structure) may correspond to a dark (e.g., brown in a colored image) region in the images 401; 301.

In both illustrative examples, the kidney in FIGS. 6A, 6B and 6C as well as the hip in FIGS. 7A, 7B and 7C, the rendered medical image 401 with the smoothed clipping (also denoted as soft clipping) in FIG. 6C or 7C closely matches a reference image 301 rendered with the conventional (e.g., sharp) clipping in FIG. 6B or 7B, respectively.

Figure 8A:
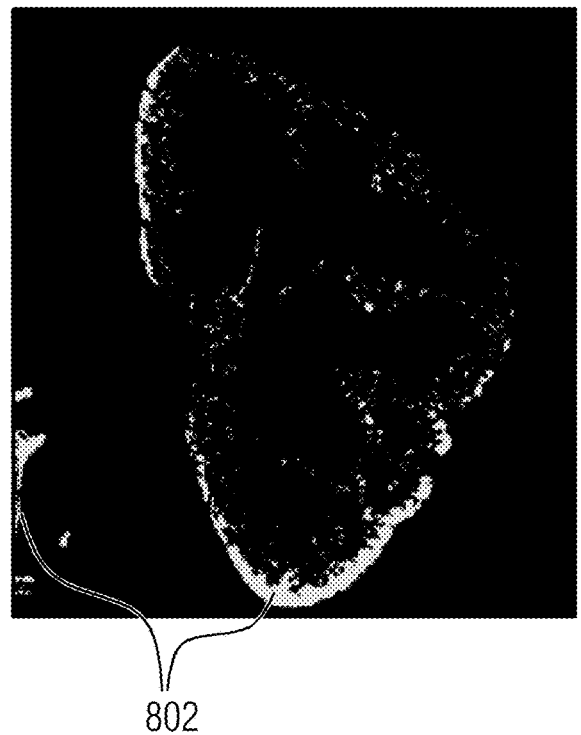
FIGS. 8A and 8B show example loss functions for the rendering of the left kidney and left hip joint with clip planes according to FIGS. 6C and 7C relative to the conventional, in particular manually selected, reference images of FIGS. 6B and 7B, respectively.
Figure 8B:
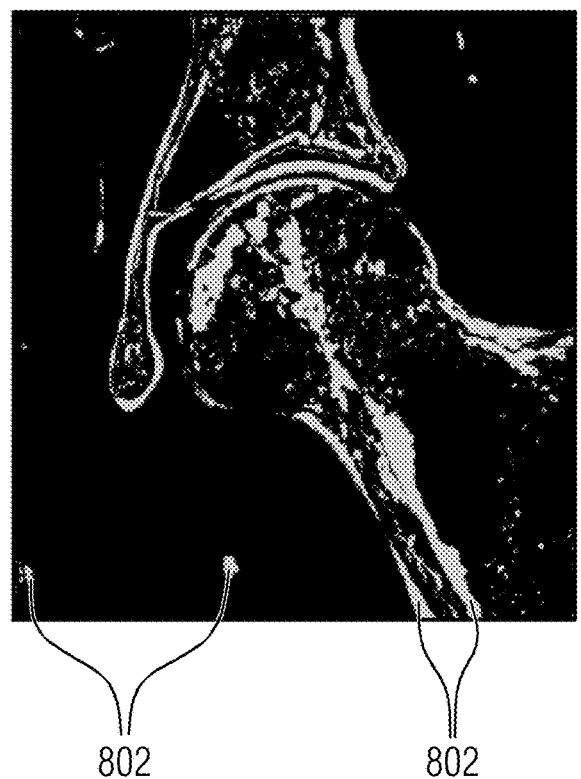

FIGS. 8A and 8B exemplarily illustrate the difference and/or loss function (e.g., as MSE) between the medical image 401 obtained using the technique and the reference image 301 using conventional, in particular manual, clipping for the left kidney of FIGS. 6C and 6B and the left hip of FIGS. 7C and 7B, respectively.

The main difference in FIGS. 8A and 8B between the images 401; 301 is that when the smoothed clip plane (also denoted as soft clip plane) is used, the rendered image appears a bit less sharp. E.g., in FIGS. 8A and 8B contours of the left kidney and the left hip, which are sharp in the reference images 301 of FIGS. 6B and 7B, respectively, show a slight difference from the smoothed contours of the medical images 401 of FIGS. 6C and 7C, respectively.

According to the technique, it is possible, given an appropriate (e.g., depending on the received reference information) loss function, to estimate the rendering parameters, including one or more clip plane parameters. E.g., FIG. 9 shows another illustrative example as an illustration from a medical book serves as reference image 408.

Figure 9:
FIG. 9 shows an example of a reference image as reference information based on an illustration in medical literature.

While FIG. 9 shows a particularly simple (and/or rudimentary) example of a hip joint, the reference image 408 may include a plethora of reference structures (e.g., acetabulum, fibrous capsule, cavity of joint, synovial membranes, cartilage, head of femur, ligament of head of femur, synovial membranes, transverse ligament of acetabulum, fibrous capsule, zona orbicularis, and/or pubofemoral ligament, in particular as described in the context of FIG. 4B).

The technique provides a method for rendering a hidden structure of a volumetric data set when rendering a medical image based on the volumetric data set received from a medical scanner. A reference information indicative of a parameter for a (in particular smoothed, and/or soft) clip plane is received for rendering the hidden structure within the medical image. A DR algorithm is applied on the received volumetric data set, which includes determining a light accumulation along a viewing ray. The (in particular smoothed, and/or soft) clip plane is approximated by including a smooth approximation to a Dirac delta distribution, which depends on the parameter included in the received reference information, in the determining of the light accumulation along the viewing ray. The parameter for the (in particular smoothed, and/or soft) clip plane is optimized by optimizing an objective function. The medical image with the hidden structure visible is output for final rendering, and/or for display.

Parameters are used to optimize the location, position, and/or orientation of clip planes, and/or surfaces on the scene.

A slight (and/or somewhat) softening of clipping areas, e.g., due to a Gaussian function removing the discontinuities of conventional (e.g., sharp) clip planes, and/or automatic 3D rendering with clipping may be considered as characteristic for the technique.

Wherever not already described explicitly, individual embodiments, or their individual aspects and features, described in relation to the drawings can be combined or exchanged with one another without limiting or widening the scope of the described invention, whenever such a combination or exchange is meaningful and in the sense of this invention. Advantages which are described with respect to a particular embodiment of present invention or with respect to a particular figure are, wherever applicable, also advantages of other embodiments of the present invention.

The invention claimed is:

1. A computer-implemented method for rendering a hidden structure of a volumetric data set when rendering a medical image based on the volumetric data set, the computer-implemented method comprising:
   receiving the volumetric data set from a medical scanner;
   receiving reference information indicative of at least one parameter for a clip plane within the volumetric data set for rendering the hidden structure represented in the received volumetric data set;
   applying a differentiable rendering (DR) algorithm on the received volumetric data set for rendering the medical image with the hidden structure, wherein applying the DR algorithm comprises determining a light accumulation along a viewing ray, wherein the clip plane is approximated by including a smooth approximation to a Dirac delta distribution in the determining of the light accumulation along the viewing ray, wherein the smooth approximation to the Dirac delta distribution depends on the at least one parameter comprised in the received reference information, and wherein applying the DR algorithm further comprises optimizing the at least one parameter for the clip plane by optimizing an objective function; and
   outputting the medical image with the hidden structure being visible for final rendering and/or for display, the medical image with the hidden structure being visible resulting from the applying of the DR algorithm.

2. The computer-implemented method according to claim 1, wherein the hidden structure comprises an implant.

3. The computer-implemented method according to claim 1, wherein the hidden structure comprises an anatomical structure.

4. The computer-implemented method according to claim 1, wherein the received reference information comprises a medical reference image.

5. The computer-implemented method according to claim 4, wherein the objective function comprises a loss function depending on the medical reference image, and wherein optimizing the loss function comprises minimizing and/or maximizing the loss function.

6. The computer-implemented method according to claim 1, wherein the received reference information comprises a position relative to an anatomical structure and/or relative to an organ.

7. The computer-implemented method according to claim 1, wherein the objective function comprises an image entropy, and wherein optimizing the objective function comprises maximizing the image entropy.

8. The computer-implemented method according to claim 1, wherein the at least one parameter of the clip plane comprises a position and/or an orientation of the clip plane within the volumetric data set.

9. The computer-implemented method according to claim 1, wherein the smooth approximation to the Dirac delta distribution comprises a Gaussian function.

10. The computer-implemented method according to claim 1, wherein the light accumulation is determined by raycasting, path tracing, half-angle slicing, and/or interactive volume lighting.

11. The computer-implemented method according to claim 1, wherein the at least one parameter of a clip plane comprises two or more parameters.

12. The computer-implemented method according to claim 11 wherein the two or more parameters are of two or more clip planes.

13. The computer-implemented method according to claim 1, wherein the medical scanner is a computed tomography scanner; a magnetic resonance imaging scanner; an ultrasound scanner; a positron emission tomography scanner; or a single-photon emission computed tomography scanner.

14. The computer-implemented method according to claim 5, wherein the received reference information comprises a position relative to an anatomical structure and/or relative to an organ.

15. The computer-implemented method according to claim 14, wherein the at least one parameter of the clip plane comprises a position and/or an orientation of the clip plane within the volumetric data set.

16. The computer-implemented method according to claim 15, wherein the smooth approximation to the Dirac delta distribution comprises a Gaussian function.

17. The computer-implemented method according to claim 16, wherein the light accumulation is determined by raycasting, path tracing, half-angle slicing, and/or interactive volume lighting.

18. A computing device for rendering a hidden structure of a volumetric data set when rendering a medical image based on the volumetric data set, the computing device comprising:
   a first interface configured for receiving the volumetric data set from a medical scanner;
   a second interface configured for receiving reference information indicative of at least one parameter for a clip plane within the volumetric data set for rendering the hidden structure represented in the received volumetric data set;
   a processor configured to apply a differentiable rendering (DR) algorithm on the received volumetric data set for rendering the medical image with the hidden structure, wherein the application of the DR algorithm comprises determination of a light accumulation along a viewing ray, wherein the clip plane is approximated by including a smooth approximation to a Dirac delta distribution in the determination of the light accumulation along the viewing ray, wherein the smooth approximation to the Dirac delta distribution depends on the at least one parameter comprised in the received reference information, and wherein the application of the DR algorithm further comprises optimization of the at least one parameter for the clip plane by optimization of an objective function; and
   an output interface configured for outputting the medical image with the hidden structure being visible for final rendering and/or for display, the medical image with the hidden structure being visible resulting from the application of the DR algorithm.

19. The computing device according to claim 18, further comprising:

one or more medical scanners configured for providing the volumetric data set; and a display device configured for receiving the medical image with the hidden structure from the output interface, wherein the display device is further configured to display and/or render the received medical image with the hidden structure.

20. A non-transitory computer-readable medium on which program elements are stored that can be read and executed by a processor, in order to render a hidden structure of a volumetric data set when rendering a medical image based on the volumetric data set, wherein the program elements as executed by the processor comprise:

applying a differentiable rendering (DR) algorithm on the volumetric data set for rendering the medical image with the hidden structure, wherein applying the DR algorithm comprises determining a light accumulation along a viewing ray, wherein a clip plane is approximated by including a smooth approximation to a Dirac delta distribution in the determining of the light accumulation along the viewing ray, wherein the smooth approximation to the Dirac delta distribution depends on at least one parameter for the clip plane comprised in received reference information, and wherein applying the DR algorithm further comprises optimizing the at least one parameter for the clip plane by optimizing an objective function; and outputting the medical image with the hidden structure being visible for final rendering and/or for display, the medical image with the hidden structure being visible resulting from the applying of the DR algorithm.

* * * * *